United States Patent [19]

Girardi

[11] 4,274,775
[45] Jun. 23, 1981

[54] BROACHING MACHINE COMPOUND SHUTTLE

[75] Inventor: Vincent J. Girardi, Grosse Pointe Woods, Mich.

[73] Assignee: The Babcock & Wilcox Company, New Orleans, La.

[21] Appl. No.: 81,706

[22] Filed: Oct. 4, 1979

[51] Int. Cl.$^3$ ............................................. B23D 41/06
[52] U.S. Cl. ................................. 409/251; 409/256; 409/271
[58] Field of Search ............... 409/251, 256, 257, 268, 409/270, 271, 274

[56] References Cited

U.S. PATENT DOCUMENTS

| 2,751,821 | 6/1956 | Scrase et al. | 409/271 |
| 2,870,688 | 1/1959 | Bonnafe | 409/256 |
| 3,799,030 | 3/1974 | Schubert | 409/251 |
| 4,212,573 | 7/1980 | Fields | 409/251 |

Primary Examiner—Z. R. Bilinsky
Attorney, Agent, or Firm—Robert J. Edwards; John F. Luhrs

[57] ABSTRACT

A compound shuttle for a broaching machine having a pair of spaced parallel broach trains carried on a common slide reciprocable in forward and reverse passes past a work-piece mounted on a compound shuttle for positioning the work-piece into the path of a broach train during a forward pass, away from the broach train during reverse passes and moving the work-piece from axial alignment with one broach train into axial alignment with the other broach train upon completion of a forward pass.

4 Claims, 3 Drawing Figures

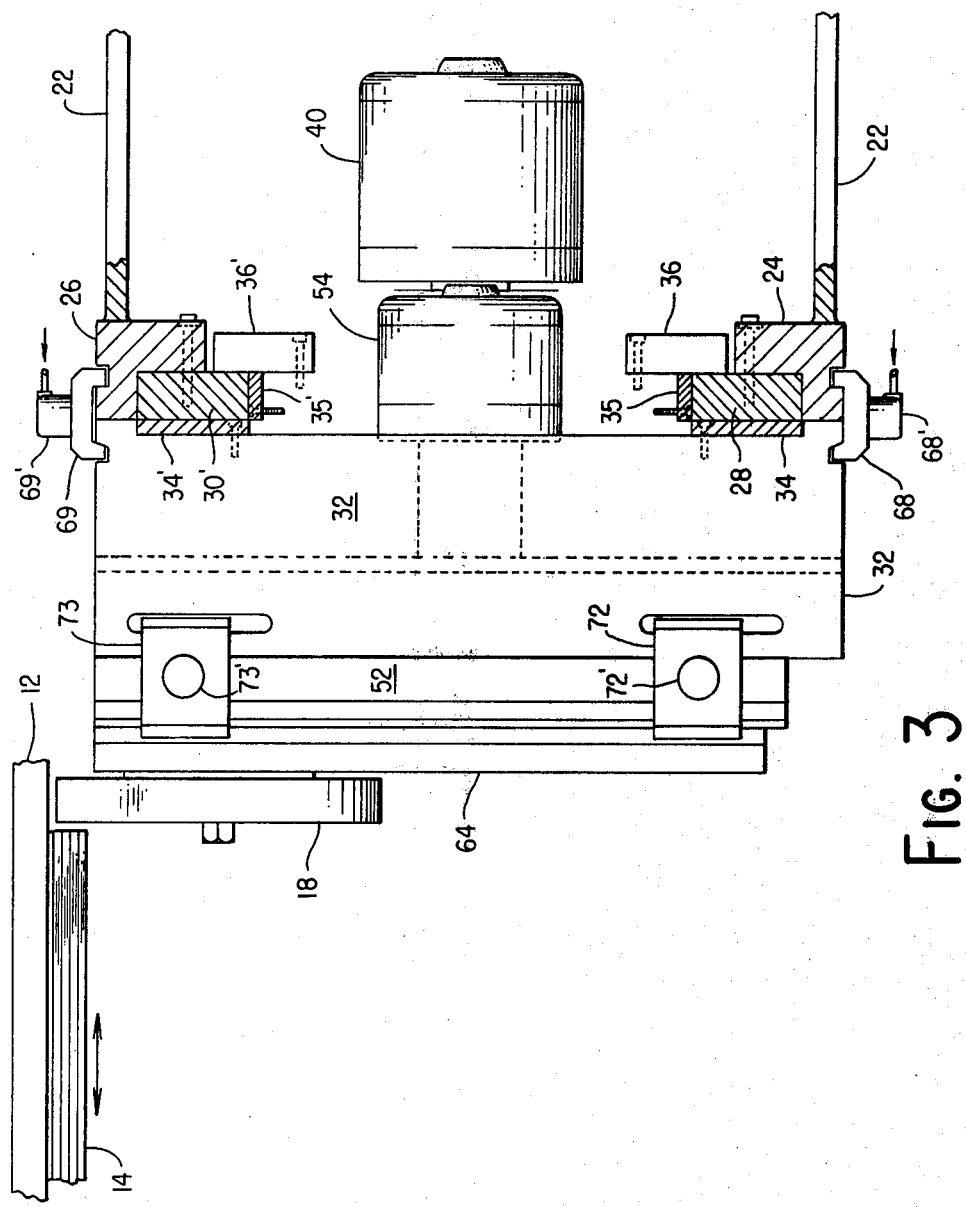

BROACHING MACHINE COMPOUND SHUTTLE

This invention relates to a shuttle for positioning a work-piece into operative position prior to the forward or cutting pass of a broach and retracting the work-piece to clear the broach during the reverse pass. More particularly, it relates to a shuttle which additionally positions a work-piece from a first or rough cut broach to a second or finish cut broach which are mounted on a common slide.

BACKGROUND OF THE INVENTION

U.S. Pat. No. 2,751,821 illustrates and describes a typical broaching machine. Essentially such a machine comprises a frame, a broach carrying slide which is reciprocated between limits on ways secured to the frame. Also secured to the frame at approximately midway the slide travel limits is a knee on which is mounted a work supporting shuttle, which prior to the cutting pass of the broach brings the work-piece into operative position relative to the broach and at the termination of the cutting pass retracts the work-piece to clear the broach during the reverse or idle pass.

When exceptionally long broaching cuts are required the over-all length of the machine becomes prohibitive. The required length can be substantially halved by splitting the broach train into two parts and mounting both parts on the slide in spaced parallel relationship forming, in effect, two broach trains.

The work-piece is sequentially then brought into engagement with the first broach train, for what may be termed a rough cut, and then with the second broach train, for what may be termed a finish cut.

U.S. Pat. No. 2,870,688 discloses a by-level broaching machine wherein the work-piece is continuously maintained in the path of the broach trains. The rough cut broach train engages the work-piece on a forward pass of the broach slide and the second broach train engages the work-piece on the reverse pass of the broach slide. As a broaching operation imposes terrific forces on the work-piece, if both the forward and reverse passes of the broach slide are working passes, then, as recognized in U.S. Pat. No. 2,870,688, it is necessary to provide a back-up fixture capable of absorbing such forces to prevent distortion of the work-piece for the reverse as well as for the forward passes of the broach slide.

BRIEF SUMMARY OF THE INVENTION

In accordance with this invention the need for a back-up fixture for rigidly holding the work-piece in position during reverse passes of the slide is eliminated by a compound shuttle which, during reverse passes, retracts the work-piece from the broach slide and sequentially moves the work-piece into the path of the first or rough cut broach train and then into the path of the second or finish cut broach train during forward passes of the broach slide.

IN THE DRAWINGS

FIG. 3 is a fragmentary top plan view of the compound shuttle illustrated in FIG. 1.

DETAILED DESCRIPTION

Figure 1:
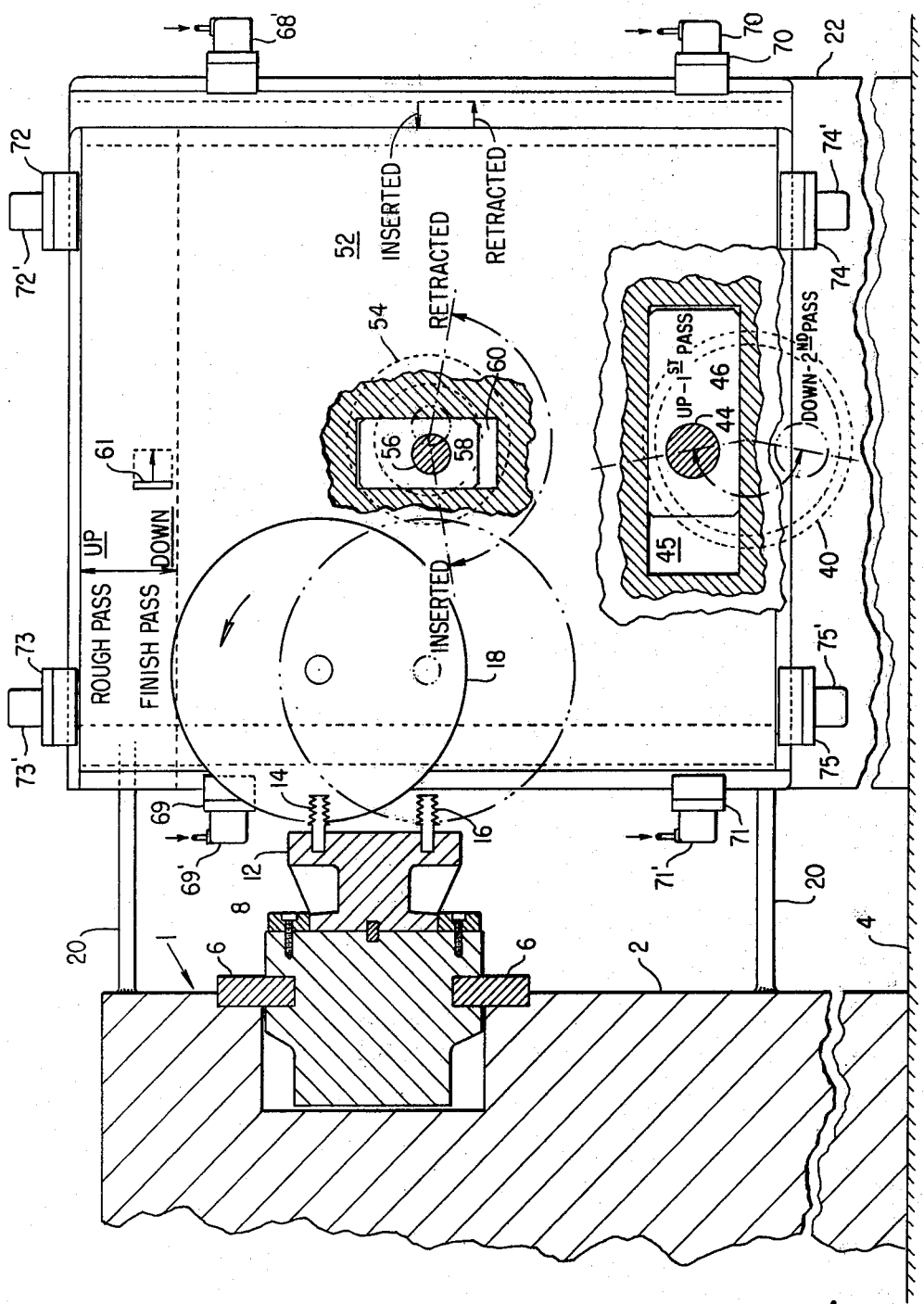
FIG. 1 is a side elevation view of a compound shuttle embodying features of this invention.

Referring now to the drawings, wherein like characters designate like or corresponding parts throughout the several views, there is shown, in cross-section in FIG. 1, a horizontal broaching machine, generally indicated at 1, having a main frame 2, anchored to a foundation 4. Supported by the frame 2, through ways 6, is a slide 8 movable along the ways 6 at a selected speed, in forward and reverse passes, by a servo-motor (not shown). Secured to the slide 8 is a broach holder 12 in which are mounted in parallel vertically spaced relationship a rough broach train 14 and a finish broach train 16. In the interest of brevity, details in regard to a broaching machine such as illustrated have been omitted as their construction and operation are well within the state of the art as evident from the disclosures in U.S. Pat. Nos. 2,751,821 and 2,870,688.

Extending from and secured through suitable ties, such as shown at 20, and to the foundation 4, is a knee 22 providing an enclosure for and having a configuration to support the mechanisms for horizontally moving a work-piece, such as indicated at 18, into and out of the path of broach train 14 or broach train 16; and for moving the work-piece from axial alignment with one broach train to the other. As such a knee per se forms no part of the present invention it has been schematically illustrated, as required, in the drawings to show the essential points of support of the mechanisms to the knee 22, which are, as in FIG. 2, indicated by conventional ground markings.

Figure 2:
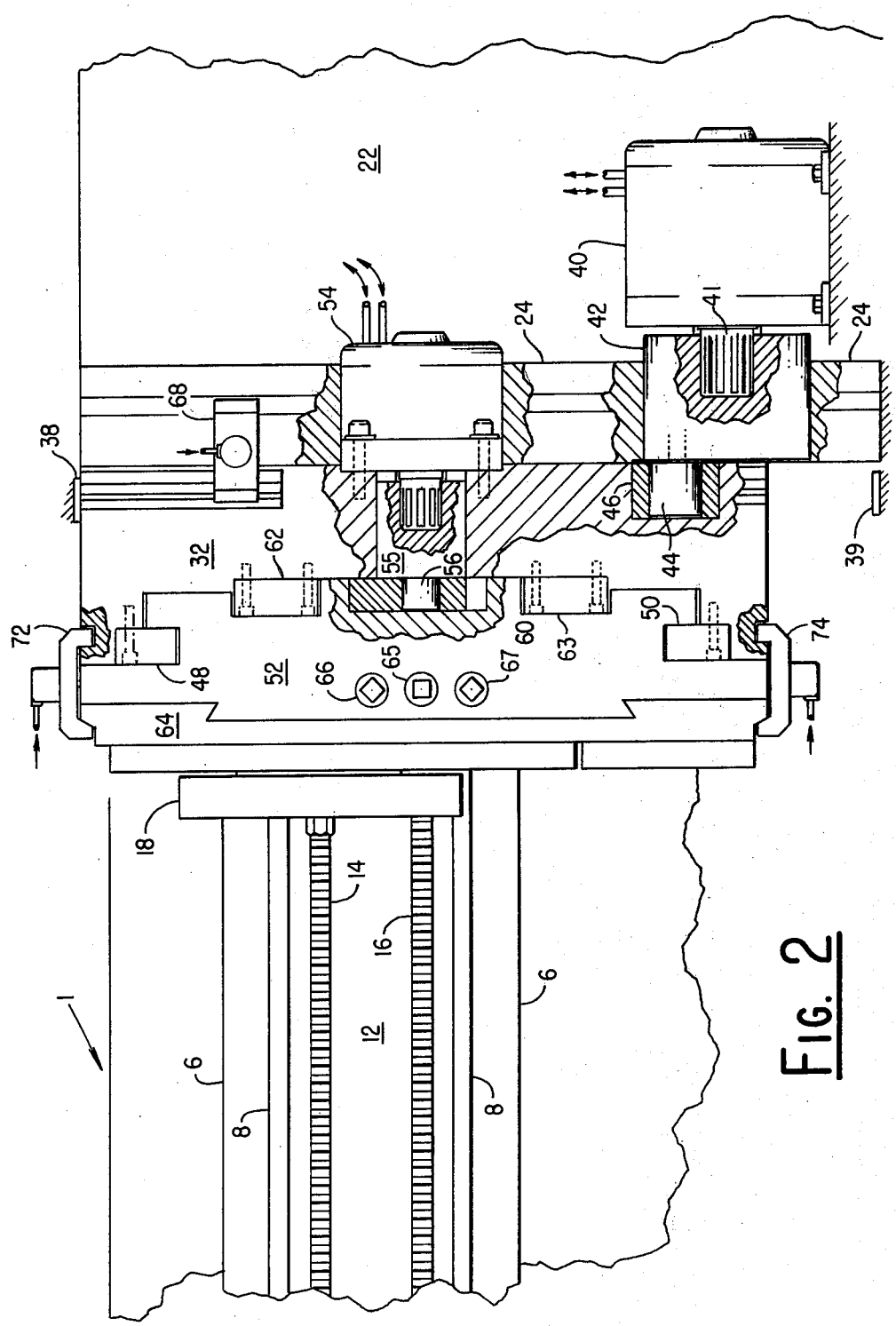
FIG. 2 is a front elevation view of the compound shuttle illustrated in FIG. 1.

Secured to the knee 22 are vertical support members 24, 26 disposed in a plane perpendicular to the longitudinal center line of the slide 8, to which are secured ways 28, 30. A shuttle table 32 is maintained in contact with the ways 28, 30 and constrained to motion in a vertical plane by means of gibs 34, 35, 36 and 34', 35', 36', respectively. As shown in FIG. 2 the vertical movement of the shuttle table 32 is constrained by a stop 38, limiting the travel in an up direction and by a stop 39, limiting the travel in a down direction. The stops 38, 39 preferably are adjustable to provide vertical movement of the table 32 sufficient to move the work-piece from axial alignment with one broach train to the other. For purposes of simplicity and clarity the stops 38 and 39 have been shown in arbitrary locations. Their actual locations and features may be chosen as required to give desired adjustability with maximum regidity and precision.

The table 32 is shuttled back and forth between stops 38, 39 by a reversible hydraulic motor 40 supported from the knee 22. While the hydraulic motor 40 may be any one of a number of acceptable designs, preferably it is the type illustrated and described in U.S. Pat. No. 2,751,821. Vertical linear movement of the table 32 from one stop to the other is obtained by approximately one-half revolution of the motor 40 by means of a crank 42, having a pin 44 forming an axle for a cross-head 46 carried in a horizontal slide 45 formed in the table 32. The motion of the crank 42 is limited in clockwise and counter-clockwise directions short of dead center by the ends of the cross-head 46 meeting the ends of the slide 45. As shown in FIGS. 1 and 2, the table 32 is at the upward limit of travel, as determined by the stop 38, with the work-piece in the path of the upper or rough broach train 14. Rotation of the motor 40 in a clockwise direction will effect downward motion of the table 32 until limited by stop 39 when the work-piece will be aligned with the lower or finish broach train 16.

The horizontal movement of the work-piece toward and away from the slide 8 is obtained by a mechanism similar to that described for the vertical movement of the table 32. Secured to the table 32 are horizontal ways 48, 50 for a horizontal shuttle table 52, movable toward and away from the slide 8 by a hydraulic motor 54, mounted on the shuttle table 32, to the output shaft of which is splined a crank 55 having a pin 56 forming an axle for a cross-head 58 disposed within a slide 60 formed in the horizontal shuttle table 52. Motion of the shuttle table 52 toward and away from the slide 8 may be limited by any suitable stops such as, for example, comprising a rearwardly extending strike plate 61 secured to the horizontal shuttle table 52 meeting opposite walls of a cutout in the vertical shuttle table 32 at the desired travel limits.

In the drawings the horizontal shuttle table 52 is shown in the inserted position with the work-piece 18 in the path of the broach train 14. Rotation of the motor 54 in a counter-clockwise direction will move the horizontal shuttle table 52 to a retracted position when the work-piece 18 will clear the shuttle trains. If required, horizontal wear plates 62, 63 can be provided to substantially eliminate wear on ways 48 and 50.

Accurate positioning of the work-piece 18 into alignment with a broach train can be obtained, if necessary, by a secondary work support table 64 movable to a precise position relative to a broach train by means such as a micrometer screw 65 and lock screws 66, 67.

The vertical shuttle table 32, when at a travel limit, is locked to support members 24, 26 by means of clamps 68, 69, 70, 71 operated by servo-motors such as schematically shown at 68', 69', 70', 71', which may be of a hydraulic, pneumatic or electric type. Similarly, at a travel limit, the horizontal shuttle table 52 is locked to the vertical shuttle table 32 by clamps 72, 73, 74, 75, operated by servo-motors 72', 73', 74', 75', respectively.

Interposed between the work-piece 18 and the horizontal shuttle table 52 there may be any one or more of various types of support and/or indexing fixtures as required by the specific type of work-piece and broaching operations to be performed. Such fixtures form no part of the present invention and have therefore not been shown as their application is well understood in the art. For the same reasons the hydraulic and electric circuits as may be required for the manual or automatic sequential positioning of the vertical and horizontal shuttle tables have not been shown. A typical sequence of operations for which such a circuit might be designed is:

(a) With the horizontal shuttle table 52 in the retracted position and the vertical shuttle table 32 in its up position a work-piece is loaded, directly or indirectly, through required fixtures on to the horizontal shuttle table 52.

(b) The servo-motor 54 then operates to position the work-piece into the path of the rough broach train 14.

(c) Following the first forward pass of the slide 8, during which a roughing cut is made in the work-piece, the servo-motor 54 operates to retract the work-piece from the path of the roughing broach train 14.

(d) During or following the first reverse pass of the slide 8, servo-motor 40 operates to position the shuttle table 32 to its down position bringing the work-piece 18 into axial alignment with the finishing broach train 16.

(e) With the work-piece in axial alignment with the finishing broach train 16, the servo-motor 54 operates to position the work-piece into the path of the finishing broach train 16.

(f) Following the second forward pass of the slide 8, during which a finishing cut is made in the work-piece. The servo-motor 54 operates to withdraw the work-piece from the path of the finishing broach train 16.

(g) During or following the second reverse pass of the slide 8 the servo-motor 40 positions the shuttle table 32 to its up position.

(h) If a single operation is to be performed, the work-piece 18 is then removed from the horizontal shuttle table 52, another work-piece loaded on the shuttle table 52 and the sequence of operations repeated.

(h$_a$) If several repeat operations are to be performed on the work-piece as in broaching the hub of a turbine wheel to receive the turbine blades, the work-piece would be mounted on an indexing fixture secured to the shuttle table 52 and the cycle of operations repeated to broach the hub as required for the predetermined number of turbine blades.

I claim:

1. A compound shuttle for a broaching machine having a plurality of spaced parallel broach trains secured to the face of a common slide which is reciprocable in stationary ways in forward and reverse passes past a work-piece, comprising, a first shuttle table, a support structure in which said first shuttle table is slidably mounted in a plane parallel to the face of said slide, a second shuttle table on which said work-piece is fixed slidably mounted on said first shuttle table in a plane transverse to said first plane, means for positioning said first shuttle table from a first fixed position wherein said work-piece is axially aligned with one of said broach trains to a second fixed position wherein the work-piece is axially aligned with another one of said broach trains and means for positioning said second shuttle table from a first fixed position wherein the work-piece is in the path of a broach train during forward passes of the slide to a second fixed position wherein the work-piece is out of the paths of the broach trains during reverse passes of the slide.

2. A compound shuttle as set forth in claim 1 further including means for locking said second shuttle table when in a fixed position to said first shuttle table.

3. A compound shuttle table as set forth in claim 1 further including means for locking said first shuttle table when in a fixed position to said support structure.

4. A compound shuttle as set forth in claim 1 wherein said means for positioning said first shuttle table comprises a rectangular slot in said first shuttle table having its longitudinal center line at a right angle to the linear motion of said first shuttle table, a cross-head slidably mounted in said slot, a crank having a pin forming an axle on which said cross-head is mounted, a servo-motor mounted on said support structure operatively connected to said crank for rotating said crank in clockwise and counter-clockwise directions between limits established by said cross-head striking ends of said rectangular slot, and said means for positioning said second shuttle table comprises a second rectangular slot in said second shuttle table having its longitudinal center line at right angles to the linear motion of said second shuttle table, a second cross-head slidably mounted in said second rectangular slot, a second crank having a pin forming an axle on which said second cross-head is mounted, a second servo-motor mounted on said first shuttle table operatively connected to said crank for rotating said second crank in clockwise and counter-clockwise directions between limits established by said second cross-head striking the ends of said second rectangular slot.

* * * * *